(12) United States Patent
Yamamoto

(10) Patent No.: US 8,708,913 B2
(45) Date of Patent: Apr. 29, 2014

(54) ULTRASONIC IMAGING APPARATUS

(75) Inventor: Mariko Yamamoto, Kokubunji (JP)

(73) Assignee: Hitachi Medical Corporation, Tokyo (JP)

( * ) Notice: Subject to any disclaimer, the term of this patent is extended or adjusted under 35 U.S.C. 154(b) by 1210 days.

(21) Appl. No.: 12/222,888

(22) Filed: Aug. 19, 2008

(65) Prior Publication Data

US 2009/0112090 A1   Apr. 30, 2009

(30) Foreign Application Priority Data

Oct. 25, 2007 (JP) .................................. 2007-278021

(51) Int. Cl.
*A61B 8/00* (2006.01)

(52) U.S. Cl.
USPC .......................................... 600/443; 600/437

(58) Field of Classification Search
USPC .......................................... 600/407, 437–475
See application file for complete search history.

(56) References Cited

U.S. PATENT DOCUMENTS 6,106,469 A * 8/2000 Suzuki et al. .................. 600/443
6,524,252 B1 * 2/2003 Yu et al. ......................... 600/443

FOREIGN PATENT DOCUMENTS

| JP | 07-051270 | 2/1995 |
| JP | 2001-170049 | 6/2001 |
| JP | 2003-010176 | 1/2003 |

OTHER PUBLICATIONS

William F. Walker et al., The Application of K-Space in Pulse Echo Ultrasound, IEE Transaction on Ultrasonic, Ferroelectrics, and Frequency Control, May 1998, pp. 541-558, vol. 45, No. 3.
H.E. Melton et al., A—Mode Speckle Reduction with Compound Frequencies and Compound Bandwidths, Ultrasonic Imaging (1984) pp. 158-173, Hewlett-Packard Laboratories.

\* cited by examiner

*Primary Examiner* — Tse Chen
*Assistant Examiner* — Mark Remaly
(74) *Attorney, Agent, or Firm* — Antonelli, Terry, Stout & Kraus, LLP.

(57) ABSTRACT

There is provided an ultrasonic imaging apparatus capable of optimizing parameters in frequency compound imaging. The ultrasonic imaging apparatus includes an optimal parameter calculation unit that calculates optimal values of processing parameters in the frequency compound imaging, and the optimal parameter calculation unit outputs a result that satisfies $c_1\sqrt{\sigma_1}=c_2\sqrt{\sigma_2}=\ldots c_n\sqrt{\sigma_n}$ where the number of divided frequency bands is n, a bandwidth of a divided signal is $\sigma_i$ and a signal intensity at the time of addition is $c_i$ (i=1, 2, ..., n).

13 Claims, 11 Drawing Sheets

$\sigma1=\sigma2=\sigma3$
$c1=c2=c3$ $\sigma THI1 \sim \sigma 2THI \sim \sigma 3THI$
$c1=c2=c3$ $\sigma1=\sigma Gain1, \sigma2=\sigma Gain2, \sigma3=\sigma Gain3$
$c1=\sigma Gain1^{-0.5}, c2=\sigma Gain2^{-0.5}, c3=\sigma Gain3^{-0.5}$

ULTRASONIC IMAGING APPARATUS

CLAIM OF PRIORITY

The present application claims priority from Japanese patent application JP 2007-278021 filed on Oct. 25, 2007, the content of which is hereby incorporated by reference into this application.

BACKGROUND OF THE INVENTION

1. Field of the Invention

The present invention relates to a medical ultrasonic imaging apparatus, and more particularly relates to optimization of parameters for frequency compound imaging.

2. Description of the Related Art

Compounding smoothes speckles by averaging and adding signals in a plurality of directions to improve quality of vision of a minute contrast difference in an image. Particularly, in frequency compound imaging, a low frequency component and a high frequency component are subjected to signal processing, and added to thereby improve azimuth resolution itself and uniformity of resolution over an image of interest.

Regarding the conventional frequency compound imaging, there is disclosed a study of a quantitative evaluation method of an amount of speckle reduction (William F. W. et al, The Application of K-Space in Pulse Echo Ultrasound, IEEE Transactions on Ultrasound 45(3), 541-558 (1998)). Moreover, there is disclosed a study to clarify relationship between a frequency-band division method and an amount of speckle reduction in the case of two divisions (H. E. Melton, Jr. and P. A. Magnin, A-Mode Speckle Reduction with Compound Frequencies and Compound Bandwidths, Ultrasonic Imaging, 159-173 (1984)). Further, a method is disclosed in which the number of divided frequency bands is about two to five and center frequencies and coefficients are continuously changed according to their depths to keep continuity of quality (Japanese Patent Application Publication No. 2001-184677). Furthermore, a method is disclosed in which, in order to suppress a reduction in distance resolution having a tradeoff relation with an amount of speckle reduction, not only a narrowband signal but also a wideband signal containing the narrowband signal are changed to divided signals (Japanese Patent Application Publication No. 2001-170049).

SUMMARY OF THE INVENTION

However, in the above-described conventional techniques, when a frequency band is divided into any number of divided frequency bands, or into divided frequency bands with any intervals, optimal values for a center frequency and a bandwidth in the divided frequency band is not quantitatively evaluated, and unsolved problems still remain to further optimize parameters for frequency compound imaging.

It is an object of the present invention to provide an ultrasonic imaging apparatus capable of optimizing parameters for frequency compound imaging.

An ultrasonic imaging apparatus of the present invention includes a probe having a plurality of elements that transmits or receives an ultrasonic signal; a beam former that performs phasing and addition on the ultrasonic signal received by the plurality of elements; a frequency compound changing unit that performs frequency compound imaging on the ultrasonic signal subjected to phasing and addition; an ultrasonic image generation unit that generates an ultrasonic image from the signal subjected to the frequency compound imaging; and a display means for displaying the generated ultrasonic image, wherein the frequency compound unit includes: a frequency band division unit that divides the ultrasonic signal subjected to phasing and addition into signals corresponding to an arbitrary number of frequency bands; a separate detector that detects each of band divided signals obtained by dividing the ultrasonic signal subjected to phasing and addition into signals corresponding to the arbitrary number of frequency bands and that uses the detected signals as an arbitrary number of detected signals by bands; and an accumulator that adds the arbitrary number of detected signals by bands with a predetermined addition coefficient Such an addition coefficient may be also used to accomplish the following: Signal intensity of a band-divided received signal is normalized and then multiplication is performed before addition to increase or decrease the amount of signals. Moreover, such an addition coefficient may be used to accomplish the following: Signal intensity of a band-divided received signal is normalized and signal intensities in all frequency bands are set to 1, and then an addition coefficient is multiplied and an amount of signals is increased or decreased so that signal intensity at the time of signal addition is proportional to the addition coefficient.

According to the present invention, it is possible to provide an ultrasonic imaging apparatus capable of optimizing parameters for frequency compound imaging.

DESCRIPTION OF THE PREFERRED EMBODIMENTS

Figure 1:
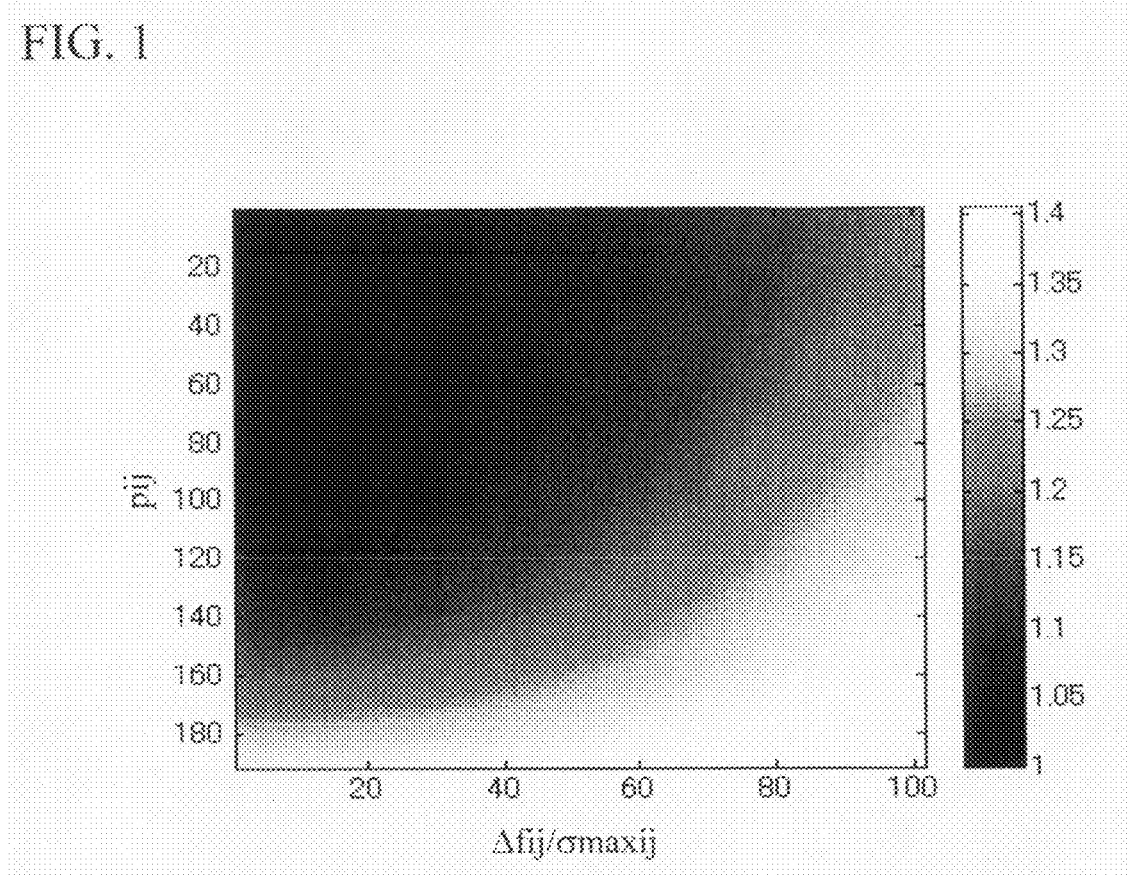
FIG. 1 is a view showing a numerical simulation result proving an effect of the present invention.

The following will explain a quantitative relationship between processing parameters and a speckle reduction effect and derivation of optimal setting.

Regarding optimal setting, specifically, a first condition for increasing a speckle reduction effect is to reduce $\Delta f_{ij}=|f_i-f_j|$ or reduce a bandwidth ratio of $p_{ij}=\sigma_i/\sigma_j$. Moreover, a maximum effect is obtained when a condition of $c_1\sqrt{\sigma_1}=c_2\sqrt{\sigma_2}=\ldots=c_n\sqrt{\sigma_n}$ is satisfied. A range for obtaining an effect of 80% or more satisfies $\sigma/\mu \leq 0.5$ where the following expression is given.

$$\mu = \sum_{i=1}^{n} c_i \sqrt{\sigma_i}$$

$$\sigma^2 = \sum_{i=1}^{n} (c_i \sqrt{\sigma_i} - \mu)^2$$

It should be noted that explanation of derivation will be given by the following order:
(1) Definition of SSNR
(2) Expansion to n Divisions
(3) Approximation of Special Function
(4) Definition of Effective Coefficient
(5) Consider Characteristic as Matrix
(6) Consider Optimization of SSNR Separately as Diagonal Element and Off-diagonal Element.
(7) Evaluation of Diagonal Component (Optimal Setting)
(8) Evaluation of Off-diagonal Component
(9) Estimation of Error
(1) Definition of SSNR An amount of speckles is evaluated by an index of SSNR (Speckle Signal Noise Ratio). SSNR is defined as follows where an average of video signals is $\mu_a$, and dispersion thereof is $\sigma_a$.

$$SSNR = \mu_a/\sigma_a$$

It should be noted that the speckle reduction effect is evaluated by a value, which is obtained when SSNR of a signal to be evaluated is divided by SSNR of a reference signal and the resultant signal is normalized. Regarding a center frequency of the reference signal and a bandwidth, any values may be used. A video signal intensity distribution is a Rayleigh distribution and an average value in the Rayleigh distribution is proportional to dispersion, and therefore SSNR of a signal on which no compounding is performed is constant regardless of the way of obtaining the values of the center frequency and the bandwidth.

(2) Expansion to n Divisions

A signal which is obtained by multiplying n video signals $a_i$ (i=1, 2, ..., n) by coefficient $c_i$ and adding up the resultant signals is given by the following expression $$\sum_{i=1}^{n} c_i \times a_i$$

and the SSNR of the signal is expressed by the following equation (1) where an average of the respective video signal intensities is $\mu_{ai}$ and dispersion thereof is $\sigma_{ai}$ and a correlation coefficient thereof is $\rho_{aiaj}$. Here, i=1, 2, ..., n, and n is the number of divided frequency bands. Equation (1) is one in which the inventor of the present invention extends SSNR described in a case where the number of divided frequency bands is two and addition coefficients are equal to each other, to SSNR in a case where the number of divided frequency bands is n and addition coefficients are arbitrarily used.

$$SSNR_{\sum_{i=1}^{n} c_i a_i}(c_i, \mu_{a_i}, \sigma_{a_i}, \rho_{a_i a_j}) = \frac{\mu_{\sum_{i=1}^{n} c_i a_i}}{\sigma_{\sum_{i=1}^{n} c_i a_i}} \quad (1)$$

$$= \frac{\sum_{i=1}^{n} c_i \mu_{a_i}}{\sqrt{\sum_{i=1}^{n}\sum_{j=1}^{n} c_i c_j \rho_{a_i a_j} \sigma_{a_i} \sigma_{a_j}}}$$

(3) Approximation of Special Function

The following will describe a case in which equation (1) is rewritten to a function of processing parameters (the number of divided frequency bands n, center frequency $f_i$, bandwidth $\sigma_i$, addition coefficient $c_i$ (i=1, 2, ..., n)) for signal frequency compound imaging.

A scatterer is expressed by a Poisson distribution of an average frequency $f_s$ (following equation 2), a divided RF signal $s_i$ is expressed by a Gaussian pulse with a carrier frequency $f_{ti}$ and dispersion $\sigma_{ti}$ (following equation (3)). At this time, a correlation $R_{titj}$ between RF signals is given by the following equation (4) and a correlation coefficient $\rho_{titj}$ is given by the following equation (5).

$$P(k) = f_s^k \frac{e^{-f_s}}{k!} \quad (2)$$

$$s_i(t) = e^{-\frac{(t-t_i)^2}{2\sigma_{ti}^2}} e^{i 2\pi f_i^t} \quad (3)$$

$$R_{t_i t_j}(0) = \frac{f_s}{2\sqrt{\pi}} \frac{1}{\sqrt{2(\sigma_{fi}^2 + \sigma_{fj}^2)}} \left( e^{-\frac{(f_{xi}-f_{xj})^2}{2(\sigma_{fi}^2+\sigma_{fj}^2)}} - e^{-\frac{(f_{xi}+f_{xj})^2}{2(\sigma_{fi}^2+\sigma_{fj}^2)}} \right) \quad (4)$$

$$\rho_{t_i t_j} = \frac{R_{t_i t_j}(0)}{\sqrt{R_{t_i t_j}(0) R_{t_i t_j}(0)}} \cong \sqrt{\frac{2\sigma_{fi}\sigma_{fj}}{\sigma_{fi}^2+\sigma_{fj}^2}} e^{-\frac{(f_{xi}-f_{xj})^2}{2(\sigma_{fi}^2+\sigma_{fj}^2)}} \quad (5)$$

A correlation $R_{aiaj}$ between the detected RF signals is expressed by the following equation (6), where a complete elliptic integral of first kind K and a complete elliptic integral of second kind E are used. Parts written by these special functions show processing in which a RF signal is multiplied by sin ($f_c \times t$) and cos ($f_c \times t$) where $f_c$ denotes a frequency shift amount, the obtained signals are frequency-shifted IQ signals, the obtained IQ signals are filtered by a lowpass filter, and thereafter a sum of squares of the resultant signals is calculated to obtain a video signal.

$$\rho_{a_i a_j} = \frac{2 \cdot \{2\varepsilon(\rho_{x_i x_j}^2) - (1-\rho_{x_i x_j}^2) \cdot K(\rho_{x_i x_j}^2)\} - \pi}{4 - \pi} \quad (6)$$

Here, the present inventor found out the following equation (7), which was an approximation having a high accuracy ($R^2 = 0.998$) where $\rho_{aiaj}$ is expressed by a rational expression of $\rho_{titj}$, and enabled the equation (1) to be rewritten to the following equation (8) which was a function of processing parameters (the number of divided frequency bands n, center frequency $f_i$, bandwidth $\sigma_i$, addition coefficient $c_i$ (i=1, 2, ..., n)) for signal frequency compound imaging.

$$\rho_{a_i a_j} = \frac{2 \cdot \{2\varepsilon(\rho_{t_i t_j}^2) - (1 - \rho_{t_i t_j}^2) \cdot K(\rho_{t_i t_j}^2)\} - \pi}{4 - \pi} \quad (7)$$

$$\approx \rho_{t_i t_j}^2 \ (R^2 = 0.998)$$

$$SSNR_{\sum_{i=1}^{n} c_i a_i}(c_i, \sigma_{f_i}, f_i) = \quad (8)$$

$$\frac{\sum_{i=1}^{n} c_i \sigma_{f_i}^{0.5}}{\sqrt{\sum_{i=1}^{n} \sum_{j=1}^{n} c_i \sigma_{f_i}^{0.5} c_j \sigma_{f_j}^{0.5} \frac{2\sigma_{f_i}\sigma_{f_j}}{\sigma_{f_i}^2 + \sigma_{f_j}^2} e^{-\frac{(f_i - f_j)^2}{\sigma_{f_i}^2 + \sigma_{f_j}^2}}}}$$

It should be noted that the fact is used that the average and dispersion of the divided video signals are proportional to the square root of dispersion of the RF signal. In other words, there is a Fourier transform relation between a pulse width $\sigma_{t_j}$ and a bandwidth $\sigma_{f_i}$ of the RF signal, and $\sigma_{f_i}$ is an inverse of $\sigma_{f_i}$ as shown in the following equation (9). Moreover, in consideration of a probability distribution of RF signal intensity, an approximation can be achieved by using the first term of Edgeworth expansion, resulting in Gaussian (equation (10)) where dispersion $\sigma_{s_i}$ is inversely proportional to a pulse width $\sigma_{t_j}$ and a typical value $f_s$ of the Poisson distribution (equation (11)). The higher the frequency of the scatterer is and the larger the pulse width of the received pulse is, the smaller the dispersion $\sigma_{s_i}$ becomes. This can be intuitively understood from an average limit theorem. Further, in consideration of a probability distribution of a video signal $a_i$, this results in a Rayleigh distribution as shown in the following equation (12). The average and dispersion are proportional to the pulse width as shown in the following equations (13) and (14). As mentioned above, the average $\mu_{ai}$ of the video signals and the dispersion $\sigma_{ai}$ are proportional to the square root of the bandwidth of the lowpass filter of the RF signal, that is, the frequency compound imaging (equations (15) and (16)).

$$\sigma_{f_i} = \sigma_{t_i}^{-1} \quad (9)$$

$$p_i(s) \cong \frac{1}{\sqrt{2\pi\sigma_{t_i}^2}} e^{-s^2/2\sigma_{t_i}^2} \quad (10)$$

$$\sigma_{s_i}^2 = \frac{1}{2 f_s \sigma_{t_i}} \quad (11)$$

$$p(a) \cong \frac{a_i}{\sigma_{t_i}^2} e^{-a_i^2/2\sigma_{t_i}^2} \quad (12)$$

$$\mu_{a_i} = \sqrt{\frac{\pi}{2}} \sigma_{t_i} \quad (13)$$

$$\sigma_{a_i} = \sqrt{2 - \frac{\pi}{2}} \sigma_{t_i} \quad (14)$$

$$\mu_{a_i} = \left(\frac{\pi}{2}\right)^{0.25} \sigma_{t_i}^{-0.5} = \left(\frac{\pi}{2}\right)^{0.25} \sigma_{f_i}^{0.5} \quad (15)$$

$$\sigma_{a_i} = \left(2 - \frac{\pi}{2}\right)^{0.25} \sigma_{t_i}^{-0.5} = \left(2 - \frac{\pi}{2}\right)^{0.25} \sigma_{f_i}^{0.5} \quad (16)$$

(4) Definition of Effective Coefficient

As described in equation (8), SSNR is expressed as a function of processing parameters for signal frequency compound imaging. However, six variables are given in the case of two divided frequency bands, nine variables are given in the case of three, and therefore in the case of the arbitrary number of divided frequency bands, it is difficult to obtain an optimal value in an intuitive manner and even in a simulation manner if nothing is done. Accordingly, the present inventor derived the following equation (17) as an expression using effective variables of SSNR. The effective variables include a product $c_i \sqrt{\sigma_{f_i}}$ of a weighting coefficient and a square root of a bandwidth of a divided signal, a bandwidth ratio $p_{ij}$ of each of the frequency bands, a larger value $f_{ijmax}$ of bandwidths of two frequency bands, and a difference $\Delta f_{ij}$ in a center frequency between two frequency bands.

$$SSNR_{\sum_{i=1}^{n} a_i}\left(c_i \sigma_{f_i}^{0.5}, p_{ij}, \frac{\Delta f_{ij}}{\sigma_{fmax\ ij}}\right) = \quad (17)$$

$$\frac{\sum_{i=1}^{n} c_i \sigma_{f_i}^{0.5}}{\sqrt{\sum_{i=1}^{n} \sum_{j=1}^{n} c_i \sigma_{f_i}^{0.5} c_j \sigma_{f_j}^{0.5} \frac{2 p_{ij}}{1 + p_{ij}^2} e^{-\frac{2}{1 + p_{ij}^2} \left(\frac{\Delta f_{ij}}{\sigma_{fmax\ ij}}\right)^2}}}$$

$$\sigma_{fmax\ ij} \equiv \max(\sigma_{f_i}, \sigma_{f_j})$$

$$p_{ij} \equiv \frac{\min(\sigma_{f_i}, \sigma_{f_j})}{\max(\sigma_{f_i}, \sigma_{f_j})}$$

$$\Delta f_{ij} \equiv |f_i - f_j|$$

Since a center frequency $f_i$ is not included in the effective variables, it is found that SSNR is not affected by the average of the center frequencies though it depends on a difference in center frequency among the divided frequency bands.

(5) Consider Characteristic as Matrix

Considering optimization of processing parameters from the equation (17) as an expression of SSNR using the effective variables, it is found that the equation (17) is expressed by a matrix (formula (19)) using the following formula (18) as an element. Accordingly, considering an optimal design of the processing parameters as a characteristic of the matrix expressed by the formula (19), it is found that the expression is simplified.

$$c_i \sigma_{f_i}^{0.5} \sigma_{f_j}^{0.5} \frac{2 p_{ij}}{1 + p_{ij}^2} e^{-\frac{2}{1 + p_{ij}^2} \left(\frac{\Delta f_{ij}}{\sigma_{fmax\ ij}}\right)^2} \quad (18)$$

-continued $$\begin{bmatrix} c_1\sigma_{f_1}^{0.5}c_1\sigma_{f_1}^{0.5} & c_2\sigma_{f_2}^{0.5}c_1\sigma_{f_1}^{0.5}\frac{2p_{21}}{1+p_{21}^2}e^{-\frac{2}{1+p_{21}^2}\left(\frac{\Delta f_{21}}{\sigma_{fmax\,21}}\right)^2} & \cdots & c_n\sigma_{f_n}^{0.5}c_1\sigma_{f_1}^{0.5}\frac{2p_{1n}}{1+p_{1n}}e^{-\frac{2}{1+p_{1n}^2}\left(\frac{\Delta f_{1n}}{\sigma_{fmax\,1n}}\right)^2} \\ c_1\sigma_{f_1}^{0.5}c_2\sigma_{f_2}^{0.5}\frac{2p_{12}}{1+p_{12}^2}e^{-\frac{2}{1+p_{12}^2}\left(\frac{\Delta f_{12}}{\sigma_{fmax\,12}}\right)^2} & c_2\sigma_{f_2}^{0.5}c_2\sigma_{f_2}^{0.5} & & \vdots \\ \vdots & & \ddots & \vdots \\ c_1\sigma_{f_1}^{0.5}c_n\sigma_{f_n}^{0.5}\frac{2p_{1n}}{1+p_{1n}^2}e^{-\frac{2}{1+p_{1n}^2}\left(\frac{\Delta f_{1n}}{\sigma_{fmax\,1n}}\right)^2} & \cdots & \cdots & c_n\sigma_{f_n}^{0.5}c_n\sigma_{f_n}^{0.5} \end{bmatrix} \quad (19)$$

(6) Consider Optimization of SSNR Separately as Diagonal Element and Off-Diagonal Element.

A numerator of SSNR expressed by the equation (17) is a sum of a square root of diagonal elements of the matrix expressed by the equation (18) and a denominator thereof is a square root of a sum of all elements. Since higher SSNR is desirable, the value of the denominator is preferably small. This means that the number of effective elements of the matrix is small. On the other hand, the matrix elements are formed by multiplying a product of $(c_i\sqrt{\sigma_i})$ and $(c_j\sqrt{\sigma_j})$ by $2p_{ij}/(1+p_{ij}^2)$ and $\exp[-(2/(1+p_{ij}^2)(\Delta f_{ij}/\sigma_{fmaxij}))]$. If it is assumed that numbering is performed in descending order of center frequency, only the product of $(c_i\sqrt{\sigma_i})$ and $(c_j\sqrt{\sigma_j})$ is left as a diagonal element. Then, the farther the value of the off-diagonal element is away from the diagonal element, the more the value of the off-diagonal element is reduced in a series by $2/(1+p_{ij}^2)$ or exponentially by $\exp[-(2/(+p_{ij}^2)(\Delta f_{ij}/\sigma_{fmaxij}))]$. For reference, FIG. 1 shows a calculation result of SSNR when $p_{ij}$ and $\Delta f_{ij}$ were changed. The element values other than $p_{ij}$ and $\Delta f_{ij}$ are set to optimal values to be described later. It is found that the maximum value is $\sqrt{2}$, and that the element values are converged to the maximum value even if $p_{ij}$ is decreased or $\Delta f_{ij}$ is increased.

This reveals that a reduction in the element values indicates an increase in independency between the divided signals and that the method for increasing the independency between the signals includes two methods: one method for reducing a bandwidth radio and the other method for separating the center frequency. Considering the independency in relation to the values of the matrix elements, it is naturally understood that the diagonal element becomes maximum and the farther the value of the off-diagonal elements are away from the diagonal element, the more the value of the off-diagonal element is reduced. Thus, it is found that optimization of SSNR can be considered separately as the diagonal element and off-diagonal element. In other words, the number of matrix elements contributes to SSNR most, and the off-diagonal can be set to substantially zero by setting $2p_{ij}/(1+P_{ij}^2)$ or $\exp[-(2/(1+p_{ij}^2)(\Delta f_{ij}/\sigma_{fmaxij}))]$ (inequalities (20) (21)). At this time, by simplifying the matter, the number of effective matrix elements is changed from $n^2$ to n. Optimal setting is achieved by setting the diagonal element $(c_i\sqrt{\sigma_i})$ of the diagonal matrix (inequality (20)) thus obtained.

$$1 \ll \frac{\Delta f_{ij}}{\sigma_{fmax\,ij}} \quad (20)$$

$$p_{ij} \ll 1 \quad (21)$$

The above is summarized as follows:

When the divided signals are set to be independent of one another, SSNR is increased. The method for setting the divided signals to be independent of one another includes two methods; one method for reducing a bandwidth radio and the other method for separating the center frequency, the former affects SSNR in a series and the latter affects SSNR exponentially. Considering this from the point of view of the matrix, this corresponds to the fact that the off-diagonal element is set to substantially zero, and in this case, the number of effective elements is changed from $n^2$ to n.

(7) Evaluation of Diagonal Component (Optimal Setting)

When only the diagonal element is made effective by the inequalities (20) and (21), a variable of the SSNR is only the number of divided frequency bands $(c_i\sqrt{\sigma_i})$ as shown in the following formula (22)

$$\begin{bmatrix} c_1\sigma_{f_1}^{0.5}c_1\sigma_{f_1}^{0.5} & & & 0 \\ & c_2\sigma_{f_2}^{0.5}c_2\sigma_{f_2}^{0.5} & & \\ & & \ddots & \\ 0 & & & c_n\sigma_{f_n}^{0.5}c_n\sigma_{f_n}^{0.5} \end{bmatrix} \quad (22)$$

At this time, the setting for maximizing SSNR is simply obtained by the following equation (23).

$$SSNR_{\sum_{i=1}^{n}c_ia_i}(c_i\sigma_{f_i}^{0.5}) \approx \frac{\sum_{i=1}^{n}c_i\sigma_{f_i}^{0.5}}{\sqrt{\sum_{i=1}^{n}(c_i\sigma_{f_i}^{0.5})^2}} \quad (23)$$

Namely, when the addition coefficients of all divided signals are made inversely proportional to the square root of the bandwidth, contributions from the respective divided signals become equal to one another, so that a satisfactory SSNR can be obtained. This condition can be expressed as in the following equation (24).

$$c_1\sqrt{\sigma_{f_1}} = c_2\sqrt{\sigma_{f_2}} = \ldots = c_n\sqrt{\sigma_{f_n}} \quad (24)$$

FIGS. 2 and 3 show numeral simulation results each showing an effect obtained by satisfying the conditional equation (24). The numeral simulation was conducted as the following steps.

(i) A scatterer was expressed by a uniform random number of [0, 1] of 8192 points.

It should be noted that a sampling frequency $f_s$ was taken as 32 MHz.

(ii) The number of divided frequency bands is set to 2.

(iii) Fourier transformation of the random number was frequency-shifted by $f_{ti}$, and a low-frequency side band was filtered through a Gaussian filter of dispersion $\sigma_{fi}$, and a square root of a sum of squares of IQ signals was calculated to obtain a video signal of a divided signal.

Figure 2A:
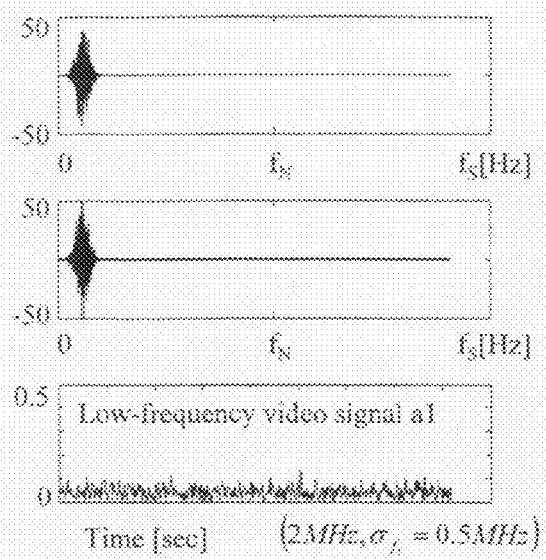
FIG. 2 is a view showing a numerical simulation result proving an effect of the present invention.
Figure 2B:
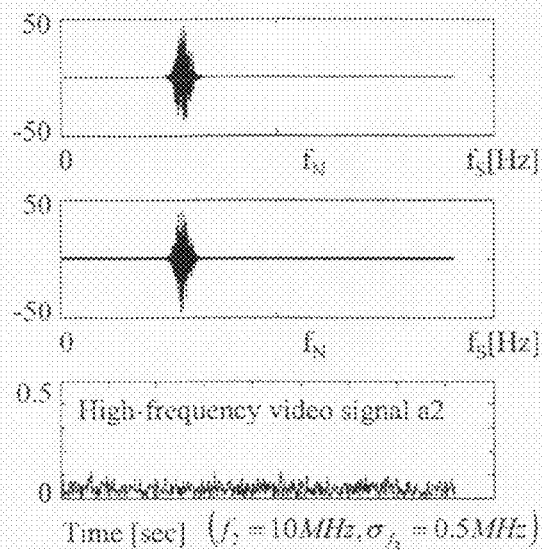
Figure 2C:
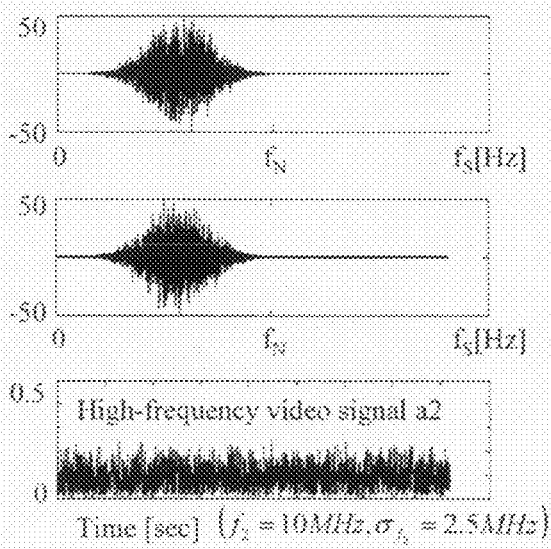
Figure 2D:
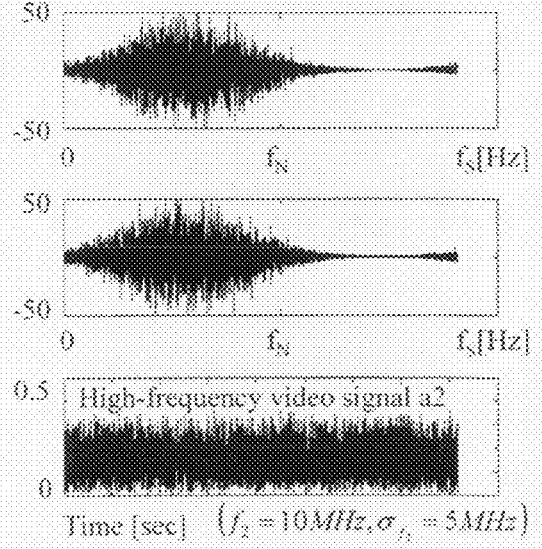

It should be noted that the low-frequency side band was fixed where a center frequency $f_{r1}=2$ MHz, dispersion $\sigma_{fi}$, was 0.5 MHz, and the high-frequency side band was fixed where a center frequency is 10 MHz (10 MHz was regarded as a value, which was sufficiently separated to a degree that it was substantially independent of the signal on the low-frequency side) and three kinds of dispersions $\sigma_{fi}$, 0.5 MHz, 2.5 MHz and 5 MHz were set. FIG. 2A shows a low-frequency video signal $a_1$, and FIGS. 2B, 2C and 2D show high-frequency video signals $a_2$, having 0.5 MHz, 2.5 MHz and 5 MHz, respectively. Moreover, in each figure, the upper stage shows a real part of the frequency distribution of RF signal, the middle stage shows an imaginary part of the frequency distribution of the RF signal, and the lower stage shows the video signal.

(iv) The bandwidth was fixed to obtain an optimal addition coefficient numerically.

Figure 3A:
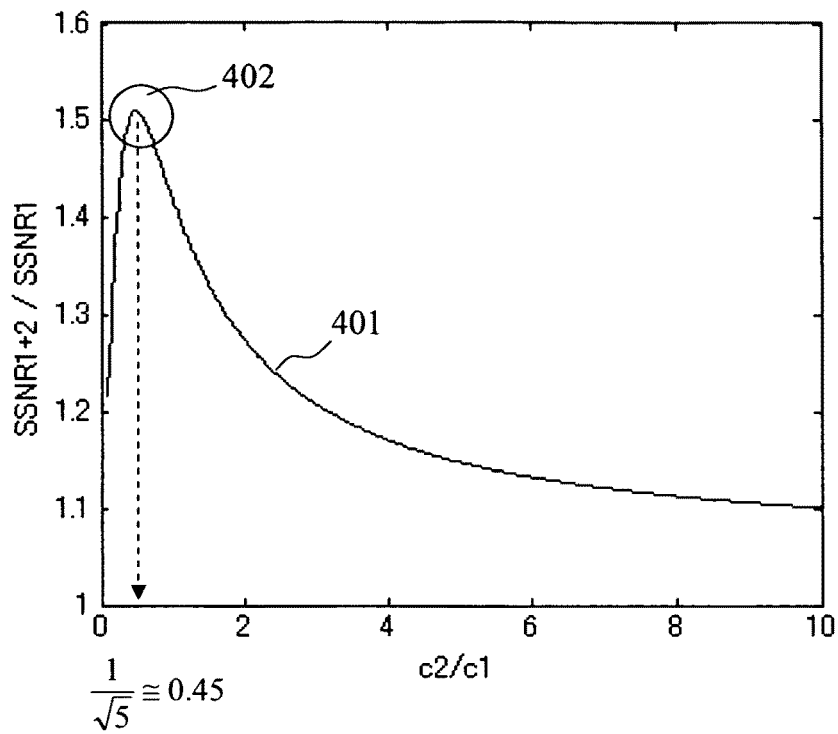
FIG. 3 is a view showing a numerical simulation result proving an effect of the present invention.
Figure 3B:
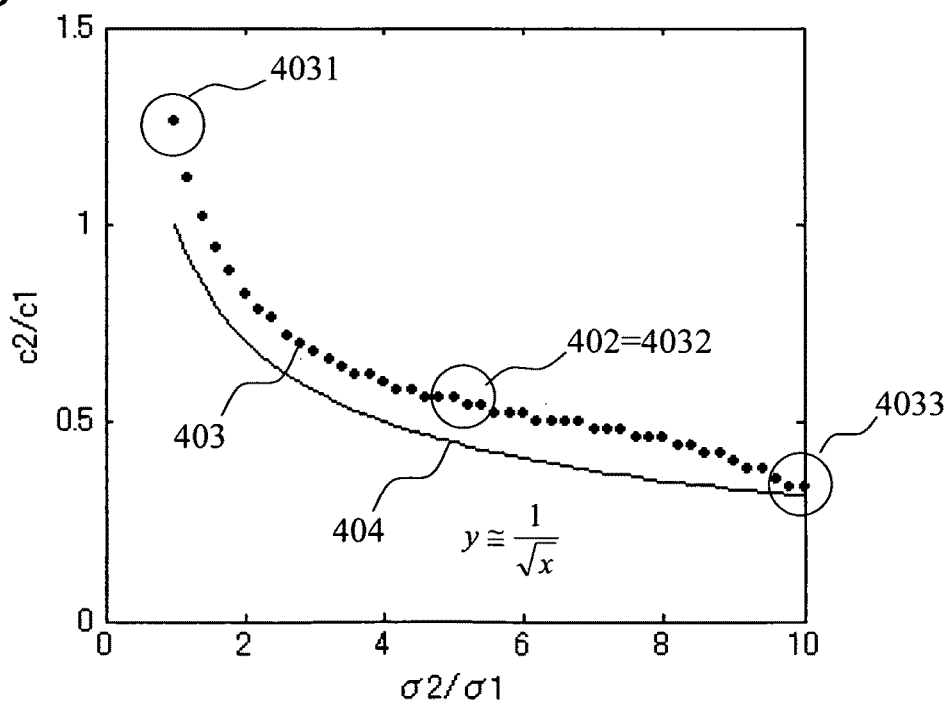

The low-frequency video signal $a_1$ and the high-frequency signal $a_2$ were multiplied by coefficients $c_1$ and $c_2$ respectively and added to each other, and an average $\mu_{1+2}$ of the added two signals and dispersion $\sigma_{1+2}$ were obtained to calculate $SSNR_{1+2}$, and the result was standardized by $SSNR_1$. FIG. 3A shows a calculation result in the case of 2.5 MHz ($\sigma_2/\sigma_1=5$) corresponding to 2C where $SSNR_{1+2}$ was a vertical axis and a coefficient ratio $c_2/c_1$ was a horizontal axis. It should be noted that it was confirmed from FIG. 2B and FIG. 2D that substantially the same graph was obtained qualitatively even when the values of $\sigma_2/\sigma_1$ differed from each other. In FIG. 3A, SSNR was changed depending on which coefficient was taken, and therefore a coefficient 402 ($1/\sqrt{5}$ to 0.45) that gave the maximum SSNR effect was obtained. Next, this processing was repeated where the values of $\sigma_2/\sigma_1$ were set every 0.2 from 1 to 10, and each of the values of $\sigma_2/\sigma_1$ and the coefficients $c_2/c_1$ that maximized SSNR were plotted as dots 403 in FIG. 3B.

4031 indicates a result obtained from the time series at which the video signals in FIGS. 2A and 2B were added. Likewise, 4032 indicates a result obtained from the time series at which the video signals in FIGS. 2A and 2B were added. 4033 indicates a result obtained from the time series at which the video signals in FIGS. 2A and 2C were added. 4032 in FIG. 3B corresponds to 402 in FIG. 3A. A curve 404 represents optimal setting $(c_2/c_1)=(\sigma_2/\sigma_1)^{0.5}$ according to the present invention. The numeral result 403 goes along the curve 404 well. It can be interpreted that shift to the smaller value of $(c_2/c_1)$ generated when $(\sigma_2/\sigma_1)$ is 8 or more is caused by a reduction in independency of the divided signal as seen from the comparison between the upper two stages in FIGS. 2D and 2A. Thus, it was proved that the equation (24), which was the optimal setting of the present invention, was reasonable.

The foregoing parameter setting is a result in which a qualitative relationship between the processing parameter and the speckle reduction effect is clarified and an optimal value is obtained based on the relationship. According to the parameter setting, contrast resolution can be enhanced to the maximum degree when the number of divided frequency bands is arbitrarily set.

Additionally, it can be confirmed theoretically and by calculation (SSNR in the Rayleigh distribution is constant) that SSNR of the video signals of these divided bands is constant regardless of the way of division (center frequency, bandwidth, intensity) unless the RF signal contains the direct current component (since scattering intensity is defined by [0, 1], the direct current component is contained. If it is defined by [−1, 1], no direct current is contained).

(8) Evaluation of Off-diagonal Component

Optimal setting was obtained by setting the off-diagonal component to zero by the inequalities (20) and (21) and by equalizing the diagonal component $c_i\sqrt{\sigma_i}$ as in the equation (24). In a case where optimal setting is performed, a condition for minimizing contribution to SSNR from the off-diagonal component is obtained although it is significantly small as compared with the contribution from the diagonal component. An equation to be solved is the equation (25) shown below and it is found that the bandwidth of the divided signal and the center frequency thereof are not independently determined.

$$\partial_{\Delta f_{ij}}\left(\sum_{i=1}^{n}\sum_{j=1}^{n}\frac{2p_{ij}}{1+p_{ij}^2}e^{-\frac{2}{1+p_{ij}^2}\left(\frac{\Delta f_{ij}}{\sigma_{fmax\,ij}}\right)^2}\right)=0, \quad (25)$$

$$i=1,2,\ldots,n-2,\; j=i+1$$

This solution is not written in a function form, but for example, in the case of the number of divided frequency bands $n=3$, a typical example is obtained as shown in the following equation (26). Then, it is found that the center frequency and the bandwidth are determined to prevent the frequency bands from being overlapped with one another.

$$\text{Case 1. } \sigma_{f1}=\sigma_{f2}=\sigma_{f3}: f_2=\frac{f_1+f_3}{2} \quad (26)$$

$$\text{Case 2. } \sigma_{f2}\gg\sigma_{f1}\sim\sigma_{f3}: f_2=\frac{f_1+f_3}{2}$$

Case 3. $\sigma_{f2}>\sigma_{f1}\sim\sigma_{f3}$: $f_2$: close to adjacent band having narrow width (9) Estimation of Error A relationship between an error in optimal setting and degree of deterioration in SSNR will be described as follows. Theoretically, SSNR is expressed by an average $\mu$ of $c_i\sqrt{\sigma_i}$ and dispersion $\sigma$ as shown in the following equation based on the definition of SSNR.

$$\mu=\sum_{i=1}^{n}c_i\sqrt{\sigma_i}$$

$$\sigma^2=\sum_{i=1}^{n}\left\{\left(c_i\sqrt{\sigma_i}\right)^2-\mu\right\}^2$$

$$SSNR=\frac{\sqrt{n}}{\sqrt{1+\left(\frac{\sigma}{\mu}\right)^2}}$$

As a result, a condition for obtaining SSNR of $p\sqrt{n}$ or more can be given as follows.

$$\sigma/\mu\leq(1-p^2)/p^2)^{0.5}$$

In the case of $p=0.8$, $\sigma/\mu\leq 0.5$ is established. Moreover, this result is proved by the following numeral simulation.

Figure 4:
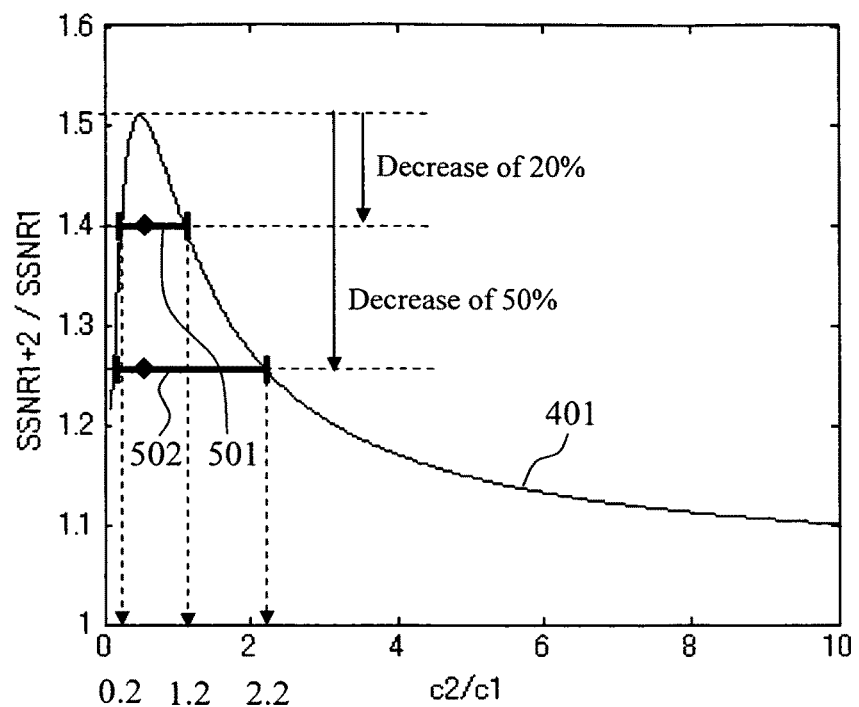
FIG. 4 is a view showing a numerical simulation result proving an effect of the present invention.
Figure 5A:
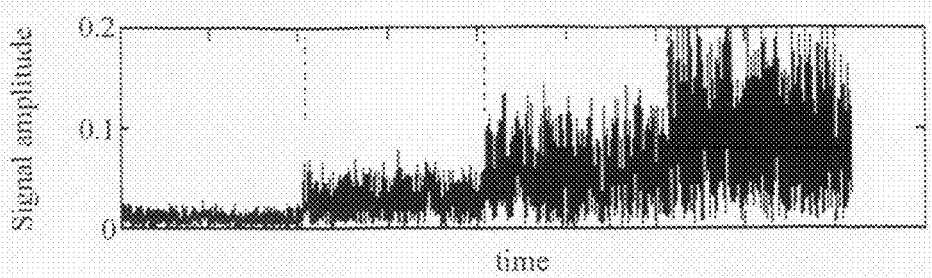
FIG. 5 is a view showing a numerical simulation result proving an effect of the present invention.
Figure 5B:
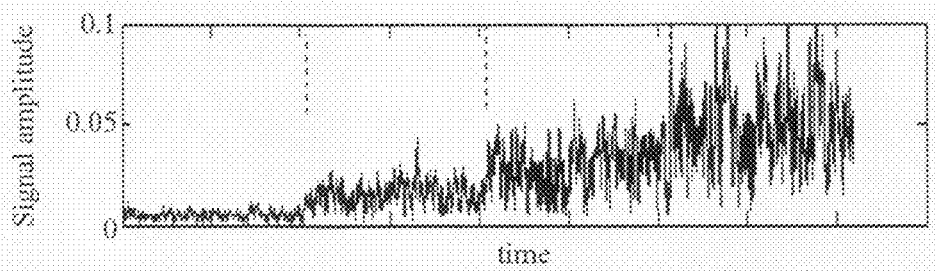
Figure 5C:
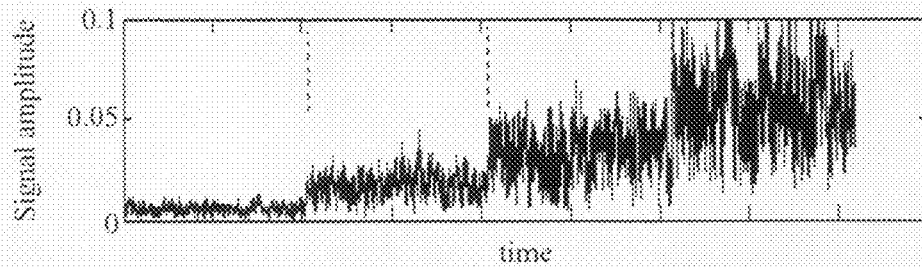
Figure 5D:
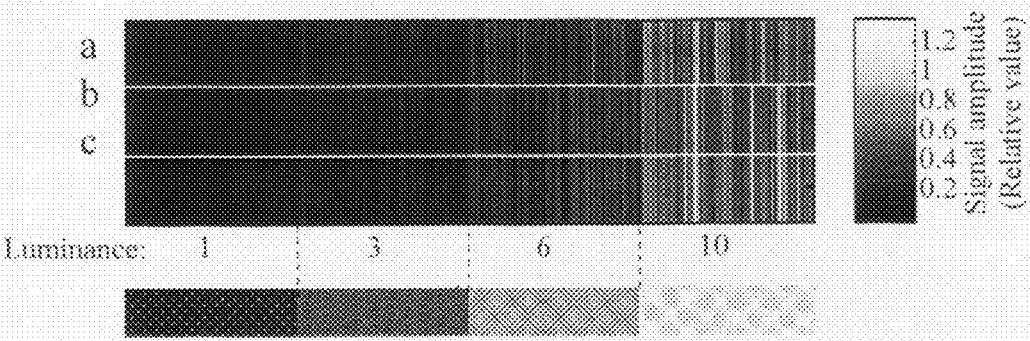

In a case where the addition coefficient $c_i$ was shifted from the optimal setting, a reduced amount of SSNR was evaluated using the relationship between $(c_2/c_1)$ and $(SSNR_{1+2}/SSNR_1)$ (curve 401 in FIG. 3A, that is, curve 401 in FIG. 4) obtained when $(\sigma_2/\sigma_1)$ was determined. A range 501 of $(c_2/c_1)$, where a decrease of 20% from the maximum value of SSNR was allowed, and a range 502 of $(c_2/c_1)$, where a decrease of 50% from the maximum value of SSNR was allowed, agreed with the forgoing theoretical value. It should be noted that if the right and left extreme values in FIG. 4 are rescaled to $c_2/c_1$ and $c_1/c_2$, respectively, a symmetric shape is formed.

Moreover, in FIG. 5, a calculation was made of a contrast difference between a case in which addition was performed using an optimal parameter and a case in which addition was performed using a parameter by which SSNR was reduced 20% theoretically. In the calculation, it was assumed that the number of calculation points was 8092 in time series, and scatterer intensity was set to 1, 3, 6, and 10 every 2048 points in order to observe contrast resolution as shown by the lowest stage in FIG. 4. A signal having the scatterer intensity was divided into a signal, having a center frequency of 2 MHz and a bandwidth σ=0.5 MHz, which corresponded to FIG. 2A, and a signal having a center frequency of 10 MHz and a bandwidth σ=2.5 MHz, which corresponded to FIG. 2C. FIG. 5A showed the latter signal on a time axis. Moreover, FIG. 5B showed a signal on a time axis as a result of addition of the divided signal using $c_2/c_1=2.2$ by which SSNR was reduced 50% according to the theoretical value, and FIG. 5C shows a signal on a time axis as a result of addition of the divided signal using an optimal value, namely, $c_2/c_1=1\sqrt{5}$. FIG. 5D is display of intensities of the respective cases in FIGS. 5A, 5B and 5C. Regarding the display on the time axis and the intensity display, it is understandable that a difference in scatterer intensity distribution is easily found out from FIG. 5B rather than FIG. 5A, and that, moreover, it is easily found out from FIG. 5C rather than FIG. 5B.

With the above-mentioned configuration, it is possible to obtain a frequency compound parameter by which contrast resolution is enhanced to the maximum based on the theoretical value when the number of divided frequency bands is arbitrarily set.

More specifically, the off-diagonal element is effectively set to zero, thereby the number of effective elements is changed from $n^2$ to n, and SSNR is enhanced from 1 to $\sqrt{n}$ to the maximum. The reduction in the off-diagonal element to zero means an increase in independency of each of the divided signals from one to another. As a method for that purpose, there are two methods: one method for separating the center frequency and the other method for reducing a bandwidth radio, and the former has an exponential effect and the latter has a series effect. By adding the signal having high independency, it is possible to improve the SN ratio.

Moreover, the more the number of signals is increased, the more SN ratio is improved, and when the number of signals n, the ratio is increased to the maximum value of $\sqrt{n}$. The maximum value of $\sqrt{n}$ is obtained when not only the adding signals are independent of one another, but also contributions of the respective signals are equal to one another. Further, the more widely the contribution of each signal varies, the more the maximum value deteriorates, and when an average of $c_1\sqrt{\sigma_1}$ representing a contribution of each signal is μ and dispersion is σ, the maximum value is multiplied by $1/(1+\sigma/\mu)^2)^{0.5}$. In a case where deterioration is 80%, σ/μ is 0.5.

It should be noted that quality of an ultrasonic image is generally evaluated by three indexes including sensitivity, distance resolution, contrast resolution. Any two of these indexes have a tradeoff relation and three indexes are related to one another. The present invention relates to a method for setting image processing parameters to obtain an optimal image, and more specifically describes a method for maximizing contrast resolution. However, in consideration of balance with other indexes, the number of divided frequency bands was set to three or more. It should be noted that in a case, such as high frequency imaging or the like, in which it is sufficient to improve only contrast resolution, the number of divided frequency bands may be two.

Moreover, in the ultrasonic imaging apparatus of the present invention, a center frequency $f_i$ (i=1, 2, . . . , n) includes a harmonic frequency, which is an integral multiple of a center frequency of a transmitting signal, and a sub-harmonic frequency, which is a fractional multiple of the center frequency, and also includes, when a transmitting pulse has frequencies included in a plurality of frequency bands, at least one of frequencies corresponding respectively to a sum frequency of these frequencies and a difference frequency therebetween. The center frequency $f_i$ (i=1, 2, . . . , n) includes N-time harmonic frequencies, which are an integral multiple of a center frequency of a probe gain. With the above-mentioned configuration, it is possible to maximize contrast resolution by the optimal parameter based on the theory even in the case of high frequency imaging.

Alternatively, in the ultrasonic imaging apparatus of the present invention, a center frequency $f_i$ (i=1, 2, . . . , n) includes a frequency at which the maximum value of a probe gain is given. With the above-mentioned configuration, even when division is performed according to discontinuity of phases of the probe gain caused by widening the band using a matching layer and backing, it is possible to maximize contrast resolution by the optimal parameter based on the theory. In this case, since phases are arranged and contrast resolution is improved, both tailing in a sound axial direction and contrast resolution can be optimized.

Or, in the ultrasonic imaging apparatus of the present invention, an addition coefficient $c_i$ (i=1, 2, . . . , n) is used as received signal intensity at a center frequency $f_i$. With the above-mentioned configuration, it is possible to maximize contrast resolution by the optimal parameter based on the theory even in the case of preserving the distribution shape of the probe gain.

Alternatively, in the ultrasonic imaging apparatus of the present invention, a center frequency $f_i$ (i=1, 2, . . . , n) includes a fractional multiple or integral multiple of a resonance frequency of a contrast medium. With the above-mentioned configuration, it is possible to maximize contrast resolution by the optimal parameter based on the theory even when a contrast medium is used.

Or, in the ultrasonic imaging apparatus of the present invention, as a frequency region of the divided signals, a region is set where the center frequency $f_i$ and the bandwidth $\sigma_i$ (i=1, 2, . . . , n) do not include a fundamental wave component or a harmonic component, and also do not include, when a transmitting pulse has frequencies included in a plurality of frequency bands, a sum frequency component of these frequencies or a difference frequency component therebetween. With the above-mentioned configuration, when a contrast medium is used, a contrast medium-derived signal can be separated from the other signals accurately, and contrast resolution can be maximized by the optimal parameter based on the theory.

Alternatively, in the ultrasonic imaging apparatus of the present invention, a center frequency $f_i$ and a bandwidth $\sigma_i$ (i=1, 2, . . . , n) are used as values for extracting only a frequency region where no phase characteristic is changed. With the above-mentioned configuration, when a type of a contrast medium that destroys bubbles is used, a contrast medium-derived signal can be separated from the other signals accurately, and contrast resolution can be maximized by the optimal parameter based on the theory.

The following will more specifically explain the aforementioned three configurations.

When contrast medium imaging is performed, harmonic and sub-harmonic are generated. Accordingly, in the basic setting in the case of the contrast medium imaging, a center frequency $f_i$ is set to contain a fractional multiple or integral multiple of a resonance frequency of the contrast medium.

Moreover, when contrast medium imaging is performed, harmonic and sub-harmonic are generated, but the presence or absence of appearance of harmonic and sub-harmonic differs depending on magnitude of sound pressure. Harmonics are generated at a relatively low sound pressure in order of 2, 3, . . . , and sub-harmonics are next generated at a threshold sound pressure in order of 1/2, 3/2, . . . . At the sound pressure at which the sub-harmonics are generated, the order of the harmonics and that of the sub-harmonics are substantially the same, resulting in a broad frequency distribution where a clear peak is difficult to be found out.

When contrast medium imaging is performed at a sound pressure which is more than a value at which the sub-harmonic is generated, the frequency distribution of signals derived from the contrast medium is broad and its locality is low. Therefore, in order to separate the medium-derived signal from the other signals accurately, there is need to provide approaches other than designation of a frequency distribution unique to the contrast medium. Two approaches can be considered: one is to remove a signal having a high locality from the frequency distribution of the contrast medium and the other is to separate a medium-derived signal using characteristics other than an intensity frequency distribution.

More specifically, in the former case, a tissue-derived harmonic component (tissue harmonic: THI) includes only the harmonic other than the fundamental wave, and therefore no sub-harmonic is caused. For this reason, locality in the frequency distribution is high as compared with a contrast medium-derived signal. Accordingly, if the contrast medium-derived signal is taken as a background and the other signal component localized in a frequency, mainly, the remainder, which is obtained by removing the fundamental wave and the tissue-derived harmonic component (THI component), is regarded as a contrast medium-derived harmonic component, it is possible to separate the contrast medium-derived signal from the other signal accurately. As a method for implementing this approach that removes the fundamental wave and the tissue-derived harmonic (THI component), pulse inversion is currently carried out and its effectiveness has been proved. In this case, specifically, as a frequency region of the divided signals, a region is set where the center frequency $f_i$ and the bandwidth $\sigma_i$ (i=1, 2, . . . , n) do not include a fundamental wave component or a harmonic component, and also do not include, when a transmitting pulse has frequencies included in a plurality of frequency bands, a sum frequency component of these frequencies or a difference frequency component therebetween.

More specifically, in the latter case, when a destructive contrast medium, typified by sonazoid, is used, a δ function sound pressure time series is caused according to destruction, thereby amplitude and phase in the frequency distribution on the harmonic side become almost completely flat. Consequently, the configuration is provided in which only the frequency region, where no phase characteristic is changed, is extracted.

Or, in the ultrasonic imaging apparatus of the present invention, it is assumed that the center frequency $f_i$, the bandwidth $\sigma_i$ and the addition coefficient $c_i$ (i=1, 2, . . . , n) are values that maximize the following function J of the image indexes $I_1$ (sound power), $I_2$ (distance resolution) and $I_3$ (contrast resolution), which are expressed by the following Expression. The function described below is expressed by a linear sum where $k_i$ is an arbitrary constant.

$$I_1 = \sum_{i=1}^{n} c_i \sigma_i$$

$$I_2 = \sum_{i=1}^{n} c_i / \sigma_i$$

$$I_3 = \frac{\sum_{i=1}^{n} c_i \sqrt{\sigma_i}}{\sqrt{\sum_{i=1}^{n} (c_i \sqrt{\sigma_i})^2}}$$

$$J = \sum_{i=1}^{3} k_i \times I_i$$

With the above-mentioned configuration, it is possible to optimize the processing parameter for frequency compound imaging with respect to not only contrast resolution but also sound power and distance resolution. According to this configuration, it is possible to optimize the contrast resolution, sound power and distance resolution by an arbitrary weighting $k_i$, and one or more of the contrast resolution, sound power and distance resolution are fixed and the rest can be optimized by an arbitrary weighting $k_i$. As a result, it is possible to obtain an image appropriate for imaging portions and purposes each having a different importance relating to the contrast resolution, the sound power and the distance resolution.

Alternatively, in the ultrasonic imaging apparatus of the present invention, it is assumed that a center frequency $f_i$, a bandwidth $\sigma_i$, and an addition coefficient $c_i$ (i=1, 2, . . . , n) are set as values that maximize the evaluation function J under the following condition where a center frequency $f_i$ of an i-th sub-band is located in a j-th band of the received signal having a center frequency $f_{0j}$ and a bandwidth $\sigma_{0j}$.

$(f_{0j}(1-\sigma_{0j}/2) \leq f_i \leq f_{0j}(1+\sigma_{0j}/2)) \wedge (\sigma_i \leq \sigma_{0j})$ (i=1, 2, . . . , n, j=1, . . . , n)

With the above-mentioned configuration, it is possible to obtain a processing parameter that maximizes SSNR as much as possible even when input signal frequency distributions differ from each other. As a result, it is possible to obtain the best possible image quality relating to a patient of extreme obesity where the input signal frequency distribution largely deviates from the average and that of a patient who has tissue degeneration Or, the ultrasonic imaging apparatus of the present invention has at least one of an evaluation weighting coefficient input means for setting each of coefficients $k_i$ of the image indexes $I_1$ (sound power), $I_2$ (distance resolution) and $I_3$ (contrast resolution) to a real number as a constant for determining importance and Lagrangian undetermined coefficients standing for imposition of a constraint condition that the image indexes are fixed; and a constraint condition input means for inputting a constraint condition upon maximizing the evaluation function J. With the above-mentioned configuration, imaging can be performed, reflecting judgment on patient's living body characteristics judged by the user, imaging portions and purposes.

Alternatively, the ultrasonic imaging apparatus of the present invention has a means for setting a center frequency $f_i$, a bandwidth $\sigma_i$, and an addition coefficient $c_i$ (i=1, 2, . . . , n) to such values that a direct current component is not included, or for removing the direct current component before frequency compound imaging. With the above-mentioned configuration, it is possible to reduce a difference between theory and mounting.

Next, an embodiment of the present invention will be specifically explained using the drawings.

Figure 6A:
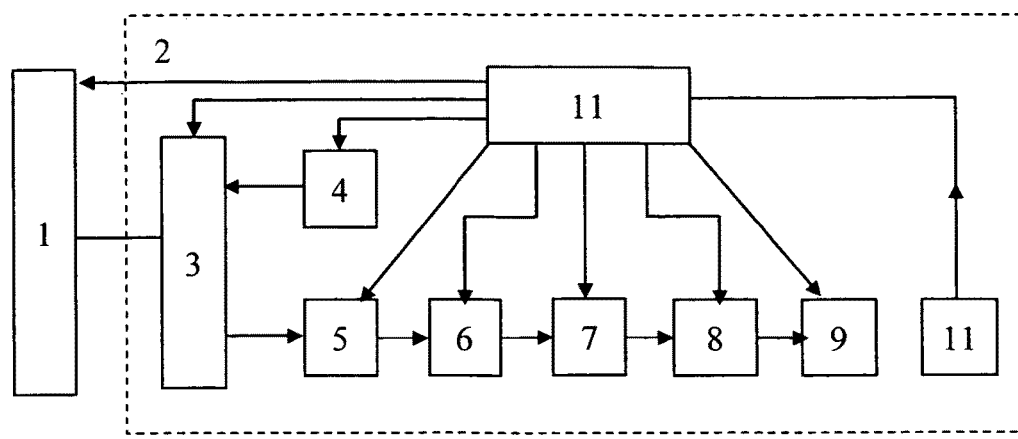
FIG. 6 is a block diagram showing an example of a configuration of an ultrasonic imaging apparatus of the present invention.

First, a configuration of an ultrasonic imaging apparatus of the present invention will be explained using FIG. 6. FIG. 6A is a block diagram showing one example of a configuration of the ultrasonic imaging apparatus of the present invention. A probe 1 is formed of a plurality of elements. An apparatus main body 2 includes a transmitting and receiving separation switch 3, a transmission beam former 4, an amplifying means 5, a reception beam former 6, a signal processor 7, a memory 8, a display means 9, an input means 10, and a control unit 11. The reception beam former 6 includes a beam former 61 and a frequency compound unit 62. The frequency compound unit 62 includes an optimal parameter calculation unit 621, a band-division unit 622, a separate detector 623, and an accumulator 624.

An ultrasonic pulse generated by the transmission beam former 4 is transmitted to a living body from the probe 1 through the transmitting and receiving separation switch 3, and the probe 1 receives an ultrasonic wave reflected from the living body. The received signal is input to the amplifying means 5 through the transmitting and receiving separation switch 3 so as to amplify the input signal, and the reception beam former 6 performs phasing/addition to enhance an SN ratio. The signal processor 7 inputs the received signal outputted from the reception beam former 6, and performs imaging. A generated image is stored in the memory 8, and thereafter is read and interpolated, and the resultant image is displayed on the display means 9. It should be noted that these processes are controlled by the control means 11.

Figure 6B:
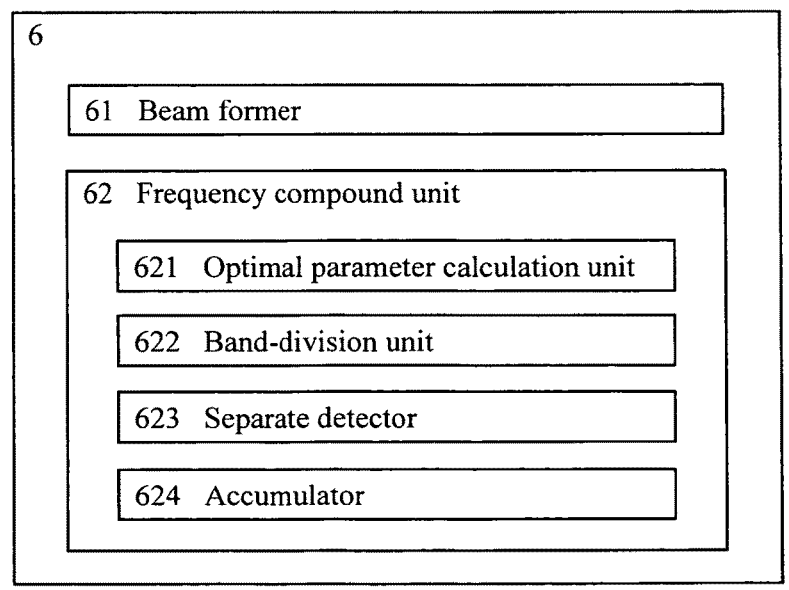
Figure 7:
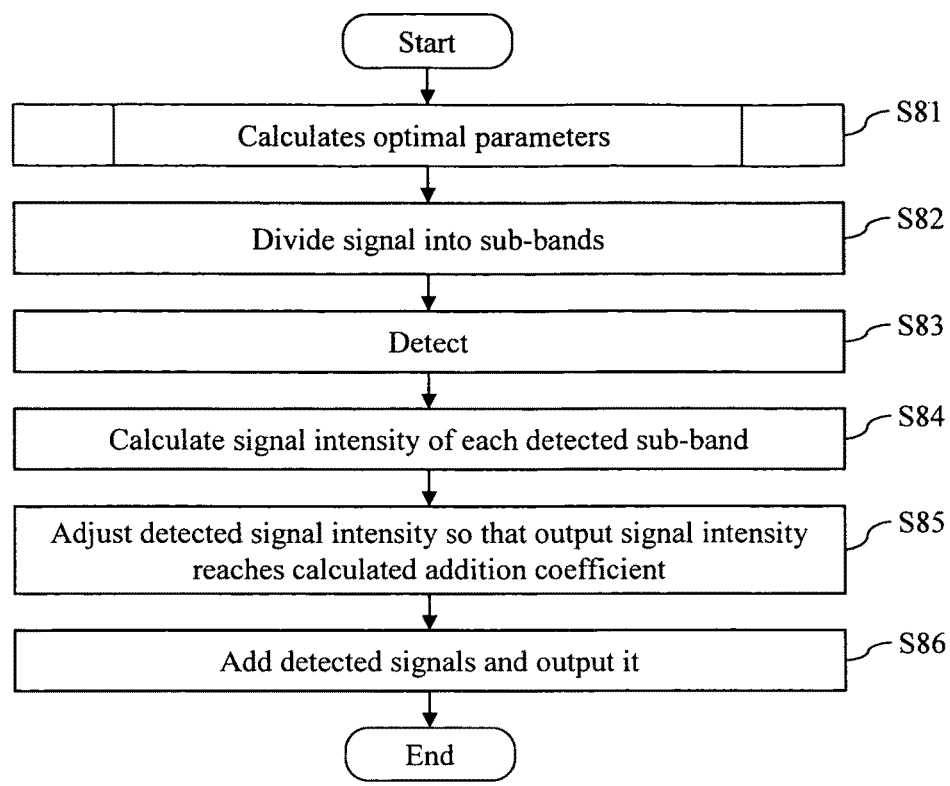
FIG. 7 is a processing flowchart explaining processing of a frequency compound unit of an ultrasonic imaging apparatus of the present invention.

Details on the frequency compound unit 62 will be explained using FIGS. 6B and 7. FIG. 7 is a processing flowchart showing processing of the frequency compound unit of the ultrasonic imaging apparatus of the present invention. The frequency compound unit 62 inputs a signal subjected to phasing by the beam former 61 and starts processing. Upon start of processing, the optimal parameter calculation unit 621 calculates optimal parameters by processing to be described later (S81). The band-division unit 622 divides the signal into n signals using a bandpass filter according to the processing parameter (S82). The separate detector 623 detects each of n signals (S83). The accumulator 624 calculates signal intensities of detected n signals (S84), adjusts the detected signal intensities so that the output signal intensities reach a calculated addition coefficient (S85), and sums up n signals and outputs it (step S86).

Figure 8:
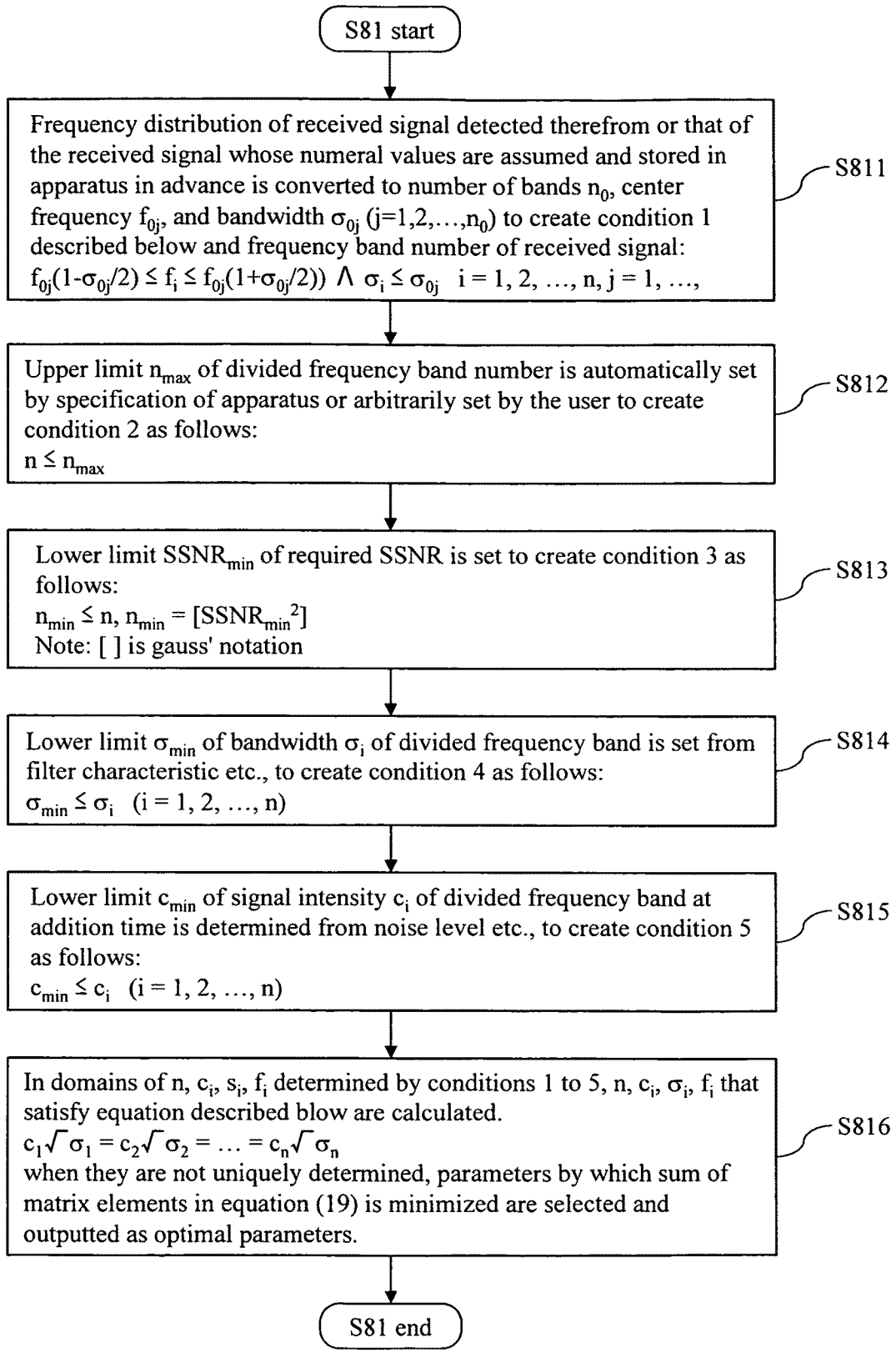
FIG. 8 is a processing flowchart explaining processing of an optimal parameter calculation unit of an ultrasonic imaging apparatus of the present invention.

The following will explain details on processing (S81) for calculating optimal parameters by the optimal parameter calculation unit 621 using FIG. 8. FIG. 8 is a processing flowchart explaining processing performed by the optimal parameter calculation unit 621. A signal subjected to phasing by the beam former 61 is supplied to the optimal parameter calculation unit 621 and processing is started. Upon start of processing, the optimal parameter calculation unit 621 sets up each processing parameter domain through five steps.

In a first step S811, the first condition is created in the following way: A frequency distribution of a received signal is detected, and the frequency distribution of the received signal detected therefrom or that of the received signal whose numeral values are assumed and stored in the apparatus in advance is converted to the number of bands $n_0$, a center frequency $f_{0j}$ and a bandwidth $\sigma_{0j}$ ($j=1, 2, \ldots, n_0$; $n_0$ is the number of bands of the received signal).

$(f_{0j}(1-\sigma_{0j}/2) \leq f_i \leq f_{0j}(1+\sigma_{0j}/2)) \wedge (\sigma_i \leq \sigma_{0j})$ ($i=1, 2, \ldots, n$, $j=1, \ldots, n_0$)     Condition 1

In a second step S812, the second condition is created in the following way: An upper limit $n_{max}$ of the number of divided frequency bands n is automatically determined by the specification of the apparatus or arbitrarily determined by the user.

$n \leq n_{max}$     Condition 2

In a third step S813, the third condition is created in the following way: A lower limit $SSNR_{min}$ of required SSNR is determined by the user.

$n_{min} \leq n$ $n_{min} = [SSNR_{min}^2]$     Condition 3

It should be noted that [ ] is Gauss' notation. This step may be omitted.

In a fourth step S814, the fourth condition is created in the following way: A lower limit $\sigma_{min}$ of a bandwidth $\sigma_i$ of a divided frequency band is determined on the basis of the filter characteristic and the like of the apparatus.

$\sigma_{min} \leq \sigma_i$ ($i=1, 2, \ldots, n$)     Condition 4

In a fifth step S815, the fifth condition is created in the following way: A lower limit $c_{min}$ of signal intensity $c_i$ of a divided frequency band at the time of addition is determined on the basis of the noise level and the like.

$c_{min} \leq c_i$ ($i=1, 2, \ldots, n$)     Condition 5

As mentioned above, processing for setting up each processing parameter domain corresponds to steps S811 to S815.

Next, in the domains of n, $c_i$, $\sigma_i$, $f_i$ determined through steps S811 to S815, n, $c_i$, $\sigma_i$, $f_i$ that satisfy the following equation is calculated.

$c_1\sqrt{\sigma_1} = c_2\sqrt{\sigma_2} = \ldots = c_n\sqrt{\sigma_n}$

In a case where n, $c_i$, $\sigma_i$, $f_i$ are not uniquely determined, parameters by which a sum of matrix elements in the equation (19) is minimized are selected and outputted as an optimal parameter.

In step S816, the following expression is given and the condition of $\sigma/\mu \leq 0.5$ may be used in place of the condition of $c_1\sqrt{\sigma_1} = c_2\sqrt{\sigma_2} = \ldots = c_n\sqrt{\sigma_n}$.

$$\mu = \sum_{i=1}^{n} c_i \sqrt{\sigma_i}$$

$$\sigma^2 = \sum_{i=1}^{n} \left(c_i \sqrt{\sigma_i} - \mu\right)^2$$

Moreover, in step S816, the following condition, where $\epsilon_{pij}$ represents a small value which is 1 or less and $df_{ij}$ represents a value which is obtained by dividing the bandwidth of the received signal by the number of divided signals, may be used in place of the condition of $c_1\sqrt{\sigma_1} = c_2\sqrt{\sigma_2} = \ldots = c_n\sqrt{\sigma_n}$.

$c_1\sqrt{\sigma_1} = c_2\sqrt{\sigma_2} = \ldots = c_n\sqrt{\sigma_n}$ $df_{ij} \leq \Delta f_{ij}$ $p_{ij} \leq \epsilon_{pij}$ The following condition may be used in place of the condition of $c_1\sqrt{\sigma_1} = c_2\sqrt{\sigma_2} = \ldots = c_n\sqrt{\sigma_n}$, where a harmonic frequency, which is an integral multiple of a center frequency, is $f_{THHi}$, a sub-harmonic frequency, which is a fractional multiple of the center frequency, is $f_{TSHHi}$, and, when a transmitting pulse has frequencies included in a plurality of frequency bands, frequencies $f_{Si}$ and $F_{Mi}$ which respectively correspond to a sum frequency of these frequencies and a difference frequency therebetween.

$$c_1\sqrt{\sigma_1} = c_2\sqrt{\sigma_2} = \ldots = c_n\sqrt{\sigma_n}$$

$$f_1 = f_{THIi}$$

$$f_2 = f_{TSHIi}$$

$$f_3 = f_{Si}$$

$$f_4 = f_{Mi}$$

Moreover, step S816 includes processing for detecting the maximum value of a probe gain, and the following condition, where a frequency at which the maximum value of the probe gain is given is $f_{Gaini}$ and a bandwidth which corresponds to $f_{Gaini}$ is $\sigma_{Gaini}$, may be used in place of the condition of $c_1\sqrt{\sigma_1} = c_2\sqrt{\sigma_2} = \ldots = c_n\sqrt{\sigma_n}$.

$$c_1\sqrt{\sigma_1} = c_2\sqrt{\sigma_2} = \ldots = c_n\sqrt{\sigma_n}$$

$$f_i = f_{Gaini}$$

$$\sigma_i = \sigma_{Gaini}$$

Further, in step S816, the following condition, where a function representing signal intensity at frequency f is G(f), may be used in place of the condition of $c_1\sqrt{\sigma_1} = c_2\sqrt{\sigma_2} = \ldots = c_n\sqrt{\sigma_n}$.

$$c_1\sqrt{\sigma_1} = c_2\sqrt{\sigma_2} = \ldots = c_n\sqrt{\sigma_n}$$

$$c_i = G(f_i)$$

Moreover, in step S816, the following condition, where a frequency of a fractional multiple or integral multiple of a resonance frequency for contrast medium is $f_{Angi}$, may be used in place of the condition of $c_1\sqrt{\sigma_1} = c_2\sqrt{\sigma_2} = \ldots = c_n\sqrt{\sigma_n}$.

$$c_1\sqrt{\sigma_1} = c_2\sqrt{\sigma_2} = \ldots = c_n\sqrt{\sigma_n}$$

$$f_i = f_{Angi}$$

Further, in step S811, instead of frequency bands themselves of the received signal, among the frequency bands of the received signal, it is assumed that a region, where neither a fundamental wave component nor a harmonic component is included, and, when a transmitting pulse has frequencies included in a plurality of frequency bands, neither a sum frequency component of these frequencies nor a difference frequency component therebetween is included, is expressed by $n_{OAng}$ frequency bands, each having a center frequency $f_{OAngj}$ and a bandwidth $\sigma_{OAngj}$. It is also assumed that a center frequency $f_i$ of an i-th sub-band is located in a j-th band. Based on these assumptions, the following condition may be created.

$$(f_{OAngj}(1-\sigma_{OAngj}/2) \leq f_i \leq f_{OAngj}(1+\sigma_{OAngj}/2)) \wedge (\sigma_i \leq \sigma_{OAngj})$$
$$(i=1, 2, \ldots, n, j=1, \ldots n_{OAng})$$

Moreover, in step S811, it is assumed that there is provided a means for detecting a frequency region where no phase characteristic is changed. Instead of frequency bands themselves of the received signal, among the frequency bands of the received signal, it is also assumed that the frequency region, where no phase characteristic is changed, is expressed by $n_{OFlt}$ bands, each having a center frequency $f_{OFltj}$ and a bandwidth $\sigma_{OFltjj}$. Moreover, it is assumed that a center frequency $f_i$ of an i-th sub-band is located in a j-th band. Based on these assumptions, the following condition may be created.

$$(f_{OFltj}(1-\sigma_{OFltj}/2) \leq f_i \leq f_{OFltj}(1+\sigma_{OFltj}/2)) \wedge (i \leq \sigma_{OFltj})\ (i=1, 2, \ldots, n, j=1, \ldots n_{OFltj})$$

An explanation will be next given of an example of a method for dividing a frequency band indicated by parameters outputted by the optimal parameter calculation unit using FIGS. 9 to 11. In the figures, a horizontal axis shows a frequency and a vertical axis shows signal intensity in dB where a frequency distribution of a received signal intensity are shown by a dotted line and a center frequency of a divided signal, a bandwidth thereof and signal intensity at the time of addition are shown by solid lines, respectively.

Figure 9A:
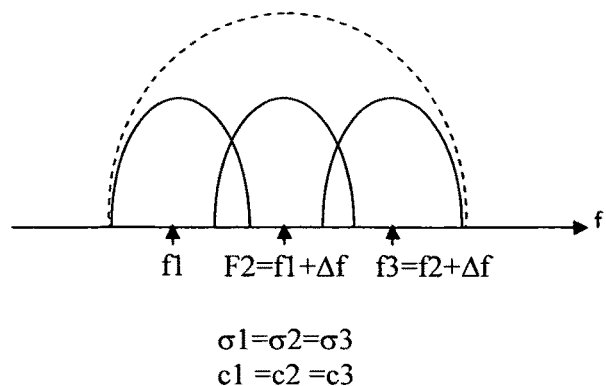
FIG. 9 is a view showing an example of a method for dividing a frequency band indicated by a parameter outputted by an optimal parameter calculation unit of an ultrasonic imaging apparatus of the present invention.

FIG. 9A shows an example of an output result that satisfies the condition of $c_1\sqrt{\sigma_1} = c_2\sqrt{\sigma_2} = \ldots = c_n\sqrt{\sigma_n}$. Namely, this is an example in which a frequency band division method is performed where the center frequencies are distributed with equal intervals, the bandwidths are equal to one another, and addition coefficients are also equal to one another.

Figure 9B:
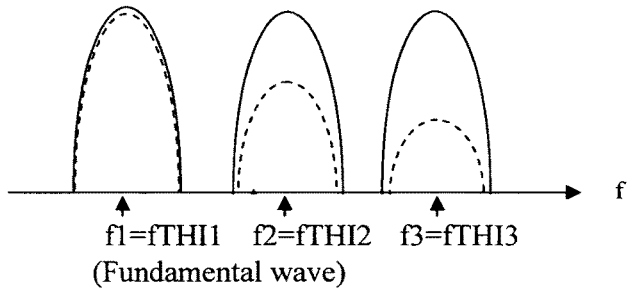

FIG. 9B shows an example of an output result in the embodiment in which a region, where a center frequency $f_i$ includes a harmonic frequency, which is an integral multiple of a center frequency of a transmitting signal, and also includes, when a transmitting pulse has frequencies included in a plurality of frequency bands, at least one of frequencies corresponding respectively to a sum frequency of these frequencies and a difference frequency therebetween. a subharmonic frequency, which is a fractional multiple of the center frequency, and In this example, triple frequencies were taken into consideration. When the bandwidths are equal to one another, all signal intensities are equal to one another at the time of addition.

Figure 9C:
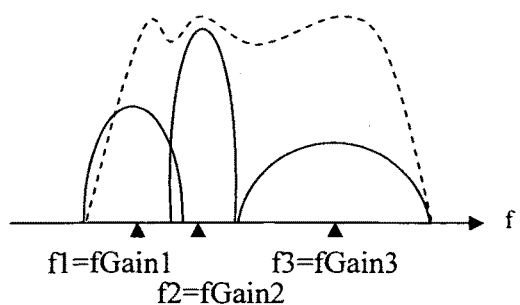
Figure 10A:
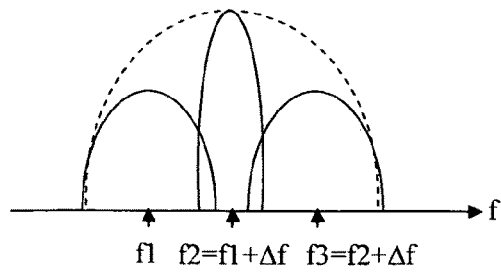
FIG. 10 is a view showing an example of a method for dividing a frequency band indicated by a parameter outputted by an optimal parameter calculation unit of an ultrasonic imaging apparatus of the present invention.
Figure 10B:
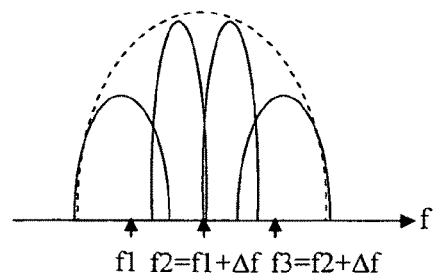

FIG. 9C shows an example of an output result in the embodiment in which a center frequency $f_i$ includes a frequency at which the maximum value of a probe gain is given. When the center frequency is fixed to an extreme value of the received signal intensity in the frequency distribution and the bandwidth is also fixed from the distribution of the received signal intensity, the addition intensity reaches a value which is inversely proportional to the square root of the bandwidth FIGS. 10A and 10B are examples of an output result in the embodiment in which an addition coefficient $c_i$ is proportional to received signal intensity at a center frequency $f_i$. In the case of preserving the distribution shape as shown in FIG. 10A, signal intensities are first determined as $c_1$ to $c_3 \ll c_2$. Regarding the bandwidths of the divided frequency bands, the signal intensities are first determined, and therefore $\sigma_i$ is inversely proportional to the square of $c_i$, resulting in $\sigma_2 \ll \sigma_1$ to $\sigma_3$. FIG. 10B is an example with consideration given to $\sigma/\mu \leq 0.5$. In the case of preserving the distribution shape, the bandwidth of the frequency band having a high intensity is exponentially narrowed. On the other hand, the width of the filter that divides the signal is a certain fixed width or more, and therefore the bandwidth of the region having a high signal intensity is set to be wider than the theoretical value. As a result, the divided signal of the region having a high signal intensity has a larger contribution to SSNR, and in an extreme case, approximation is performed using only the divided signal of the region having a high signal intensity. This raises concern of the number of divided signals m of the region having a high signal intensity. Namely, in an extreme case, SSNR becomes $\sqrt{m}$. Therefore, as shown in FIG. 10B, in the case of preserving the distribution shape, it is essential to prepare two or more divided signals having almost equal signal intensities at the time of addition in order to substantially improve SSNR.

Figure 10C:
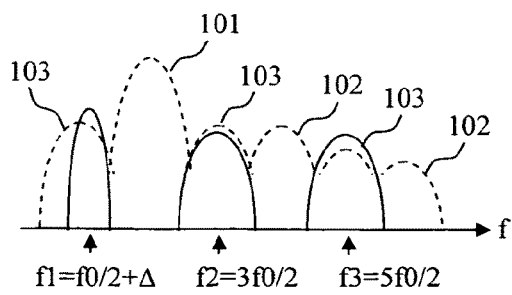

FIG. 10C shows an example of an output result in the embodiment in which, as a frequency region of the divided signals, a region is set where the center frequency $f_i$ and the bandwidth $\sigma_i$ do not include a fundamental wave component or a harmonic component, and also do not include, when a transmitting pulse has frequencies included in a plurality of frequency bands, a sum frequency component of these frequencies or a difference frequency component therebetween. A received signal is formed of a fundamental wave 101, harmonics 102 and subharmonics 103, and these components are connected to one another to form a board frequency distribution having a low locality. The frequency bands including the fundamental wave component and the harmonic components are removed, that is, only the frequency bands including subharmonics are extracted. In this example, the center frequency of the fundamental wave was described as $f_0$ and 1/2 subharmonic, 3/2 subharmonic and 5/2 subharmonic were set as divided frequency bands. It should be noted that a direct current component was included in the region of 1/2 subharmonic and therefore the center frequency was set close to the high frequency region and the bandwidth is narrowly set. As a result, regarding the signal intensity $c_i$ at the time of addition, $c_2$ and $c_3$ are equal to each other and $c_1$ is slightly higher.

Figure 10D:
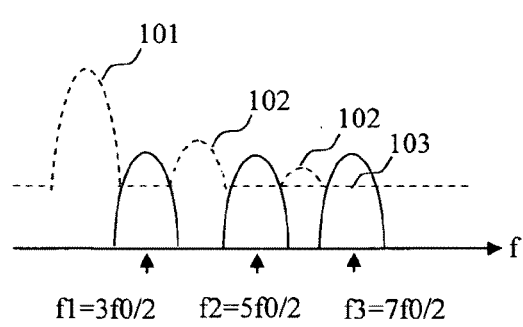

FIG. 10D shows an example of an output result of the embodiment in which a center frequency $f_i$ and a bandwidth $\sigma_i$ are used as values for extracting only a frequency region where no phase characteristic is changed. A received signal is formed of a fundamental wave 101, harmonics 102 and a region 103 where a phase and amplitude caused by a δ-function like time series is flat, and these components are connected to one another to form a board frequency distribution having a low locality. In this example, it is assumed that no subharmonic is generated. However, the region having a flat phase is extracted, with a result that a region corresponding to a subharmonic frequency band is extracted, and values of 3/2 times of the basic frequency, 5/2 times thereof and 7/2 times thereof are given to $f_1$, $f_2$, $f_3$, respectively. The result is outputted where the bandwidths are equal to one another and the signal intensities at the time of addition are also equal to one another.

Figure 11A:
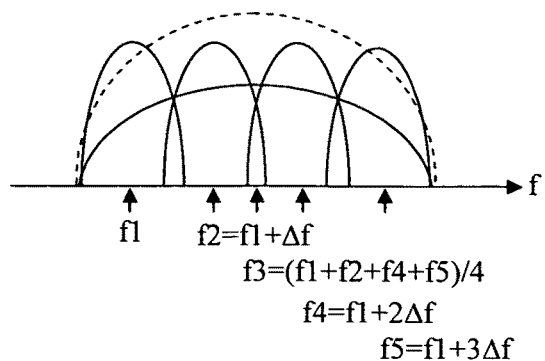
FIG. 11 is a view showing an example of a method for dividing a frequency band indicated by a parameter outputted by an optimal parameter calculation unit of an ultrasonic imaging apparatus of the present invention.

FIG. 11A shows an example of an output result in an embodiment in which an evaluation function J of sound power, distance resolution and contact resolution, which are image indexes, is maximized. A wide frequency band $f_3$ is formed to obtain distance resolution and other relatively narrow frequency bands are equally divided in a received signal intensity distribution. At this time, signal intensity $c_3$ of the wide frequency band at the time of addition is smaller than that of each of the narrow frequency bands. Moreover, the center frequency of the wide frequency band does not match any one of center frequencies of the narrow frequency bands. The former is a result obtained when products of the square roots of the addition coefficients $c_i$ of the central frequency $f_i$ and the bandwidths $\sigma_i$ are made equal to each other. The latter is a result obtained when a difference $\Delta f_{ij}=|f_i-f_j|$ in center frequency between an i-th band signal and a j-th band signal is reduced to perform frequency band division with little overlap of bands. In other words, the more the center frequencies are separated from each other, the more SSNR is improved. Accordingly, for making the wideband signals and the narrowband signals coexist, in a case where the narrowband signals are equally divided with equal intervals and the center frequencies of the wideband signals are set to an average value of the center frequencies of the narrow band signals, it is desirable that the number of narrow-band signals be even since the center frequencies of the divided signals do not match one another.

Figure 11B:
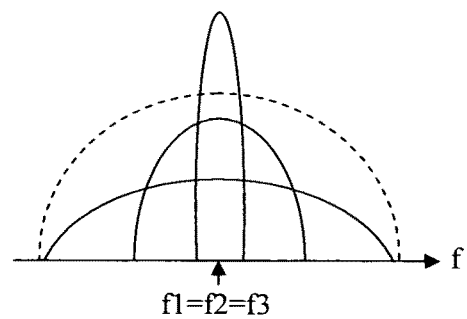

Finally, FIG. 11B shows a configuration in which SSNR can be improved even in a case where the center frequencies of the divided signals must be matched one another for some constraint. This shows an example in which a bandwidth ratio of $p_{ij}=\sigma_i/\sigma_j$ is reduced to obtain independency of the divided signal.

| Explanation of Reference Numerals | |
|---|---|
| 1 | probe |
| 2 | apparatus main body |
| 3 | transmitting and receiving separation switch |
| 4 | transmission beam former |
| 5 | amplifying means |
| 6 | reception beam former |
| 7 | signal processor |
| 8 | memory |
| 9 | display unit |
| 10 | input means |
| 11 | control unit |
| 61 | beam former |
| 62 | frequency compound unit |
| 621 | optimal parameter calculation unit |

What is claimed is:

1. An ultrasonic imaging apparatus comprising:
a probe having a plurality of elements for transmitting or receiving ultrasonic signals;
at least one of circuitry and a processor configured to effect:
   a beam former configured to perform phasing and addition on the ultrasonic signals received by the plurality of elements;
   a frequency compounder configured to perform frequency compound imaging on the ultrasonic signals subjected to phasing and addition;
   an ultrasonic image generator configured to generate an ultrasonic image from the signal subjected to the frequency compound imaging; and
   a display portion configured to effect display of the generated ultrasonic image,
wherein the at least one of circuitry and processor effect the frequency compounder to include:
   a frequency band divider configured to divide the ultrasonic signals subjected to phasing and addition into signals corresponding to an arbitrary number of frequency bands;
   a separate detector configured to detect each of band divided signals obtained by dividing the ultrasonic signals subjected to phasing and addition into signals corresponding to the arbitrary number of frequency bands and to use the detected signals as an arbitrary number of detected signals by bands; and
   an accumulator configured to add the arbitrary number of detected signals by bands with a predetermined addition coefficient,
wherein the frequency band divider is configured to divide the frequency band with a center frequency $f_i$, a bandwidth $\sigma_i$, and an addition coefficient $c_i$ (i=1, 2, . . . n) at the time of addition, which are parameters of the frequency compound imaging;
the separate detector is configured to detect the detected signals by the divided bands, respectively; and the accumulator is configured to add intensities of the respective detected signals with the addition coefficient $c_i$, and wherein the bandwidth $\sigma_i$ and the addition coefficient $c_i$ (i=1, 2, ... n) outputted by the accumulator satisfy a relationship of the following equation $$c_1\sqrt{\sigma_1} = c_2\sqrt{\sigma_2} = \ldots = c_n\sqrt{\sigma_n}.$$

2. The ultrasonic imaging apparatus according to claim 1 wherein the addition coefficient $c_i$ satisfies $\sigma/\leq 0.5$ where the following equation is given and where $\mu$ is a video signal $$\mu = \sum_{i=1}^{n} c_i \sqrt{\sigma_i}$$

$$\sigma^2 = \sum_{i=1}^{n} \left(c_i \sqrt{\sigma_i} - \mu\right)^2.$$

3. The ultrasonic imaging apparatus according to claim 1, wherein a difference $\Delta f_{ij} = |f_i - f_j|$ in a center frequency between an i-th band signal and a j-th band signal is reduced to perform frequency band division with little overlap of bands or a bandwidth ratio of $p_{ij} = \sigma_i/\sigma_j$ is reduced to perform frequency band division so that one frequency band includes the other frequency band.

4. The ultrasonic imaging apparatus according to claim 1 wherein the center frequency $f_i$ includes a harmonic frequency, being an integral multiple of a center frequency of a transmitting signal, and a sub-harmonic frequency, being a fractional multiple of the center frequency, and also includes, when a transmitting pulse has frequencies included in a plurality of frequency bands, at least one of frequencies corresponding respectively to a sum frequency of the harmonic frequency and the sub-harmonic frequency and a difference frequency therebetween.

5. The ultrasonic imaging apparatus according to claim 1, wherein the center frequency $f_i$ includes a frequency at which the maximum value of a probe gain is given.

6. The ultrasonic imaging apparatus according to claim 1 wherein the signal intensity $c_i$ of each of the adjusted separate ultrasonic signals is proportional to a received signal intensity at the center frequency $f_i$.

7. The ultrasonic imaging apparatus according to claim 1 wherein the center frequency $f_i$ includes a fractional multiple or integral multiple of a resonance frequency of a contrast medium.

8. The ultrasonic imaging apparatus according to claim 1, wherein a frequency region of the separate ultrasonic divided signals is set as a region where the center frequency $f_i$ and the bandwidth $\sigma_i$ do not include a fundamental wave component or a harmonic component, and also do not include, when a transmitting pulse has frequencies included in a plurality of frequency bands, a sum frequency component of fundamental wave component and the harmonic component or a difference frequency component therebetween.

9. The ultrasonic imaging apparatus according to claim 1, wherein the center frequency $f_i$ and the bandwidth a are used as values for extracting only a frequency region where no phase characteristic is changed.

10. The ultrasonic imaging apparatus according to claim 1, wherein the center frequency $f_i$, the bandwidth $\sigma_i$ and the signal intensity $c_i$ of each of the adjusted separate ultrasonic signals are values that maximize an evaluation function J which is expressed by a linear sum of image indexes, which are $I_1$ representing a sound power, $I_2$ representing a distance resolution, and $I_3$ representing a contrast resolution, expressed by the following Expressions, where $k_i$ is an arbitrary real number or Lagrangian undetermined coefficient $$I_1 = \sum_{i=1}^{n} c_i \sigma_i$$

$$I_2 = \sum_{i=1}^{n} c_i / \sigma_i$$

$$I_3 = \frac{\sum_{i=1}^{n} c_i \sqrt{\sigma_i}}{\sqrt{\sum_{i=1}^{n} \left(c_i \sqrt{\sigma_i}\right)^2}}$$

$$J = \sum_{i=1}^{3} k_i \times I_i.$$

11. The ultrasonic imaging apparatus according to claim 10, wherein the center frequency $f_i$, the bandwidth $\sigma_i$, and the signal intensity $c_i$ of each of the adjusted separate ultrasonic signals are set as values that maximize the evaluation function J under conditions expressed by $$(f_{0j}(1-\sigma_{0j}/2) \leq f_i \leq f_{0j}(1+\sigma_{0j}/2)) \wedge (\sigma_i \leq \sigma_{0j}) \ (i=1, 2, \ldots, n, \ j=1, \ldots, n)$$

where a center frequency $f_i$ of an i-th sub-band is located in a j-th band of the received signal having a center frequency $f_{0j}$ and a bandwidth $\sigma_{0j}$.

12. The ultrasonic imaging apparatus according to claim 10, further comprising the at least one of circuitry and processor further configured to effect at least one of an evaluation weighting coefficient setter configured to set the coefficients $k_i$ of the image indexes $I_1$, $I_2$ and $I_3$ to real numbers as constants for determining importance and Lagrangian undetermined coefficients standing for imposition of a constraint condition that image indexes are fixed; and a constraint condition input device for inputting a constraint condition upon maximizing the evaluation function J.

13. The ultrasonic imaging apparatus according to claim 1 further comprising the at least one of circuitry and processor further configured to effect an ultrasonic signal setter to set the center frequency $f_i$, a bandwidth $\sigma_i$, and the signal intensity $c_i$ of each of the adjusted separate ultrasonic signals to such values that a direct current component is not included, or for removing the direct current component before frequency compound imaging.

\* \* \* \* \*